United States Patent [19]

Bec et al.

[11] Patent Number: 5,410,433
[45] Date of Patent: Apr. 25, 1995

[54] ACCESS AND FOLLOWER CONTROL DEVICE FOR OPTICAL DISK

[75] Inventors: Daniel Bec, Villeneuve Tolosane; Jean-Pierre Le Merrer, Portet sur Garonne, both of France

[73] Assignee: Art Tech Gigadisc "ATG", Toulouse, France

[21] Appl. No.: 90,497

[22] Filed: Jul. 12, 1993

Related U.S. Application Data

[63] Continuation of Ser. No. 542,422, Jun. 22, 1990, abandoned.

[30] Foreign Application Priority Data

Jun. 30, 1989 [FR] France .................. 89 08800

[51] Int. Cl.⁶ .................................. G11B 7/09
[52] U.S. Cl. .................. 359/824; 369/44.14; 369/44.22; 359/814
[58] Field of Search .......... 369/44.11, 44.14, 44.15, 369/44.16, 44.21, 44.22, 44.32; 358/814, 824

[56] References Cited

U.S. PATENT DOCUMENTS

| | | | |
|---|---|---|---|
| 4,443,721 | 4/1984 | Jansen | 369/44.22 |
| 4,507,765 | 3/1985 | Suzuki et al. | 369/44.22 |
| 4,554,653 | 11/1985 | Malissin et al. | 369/44.16 |
| 4,845,699 | 7/1989 | Kawasaki et al. | 369/44.22 |
| 4,942,562 | 7/1990 | Suzuki | 369/44.11 |

FOREIGN PATENT DOCUMENTS

| | | | |
|---|---|---|---|
| 61-168137 | 7/1986 | Japan | 369/44.14 |
| 62-128031 | 6/1987 | Japan | 369/44.14 |
| 62-200538 | 9/1987 | Japan | 369/44.14 |
| 01014733 | 1/1989 | Japan | 369/44.14 |

Primary Examiner—Aristotelis Psitos
Assistant Examiner—P. W. Huber
Attorney, Agent, or Firm—Roland Plottel

[57] ABSTRACT

Disclosed is a device for access to and follower control of a track of an optical disk. This device has an optical head with an axis orthogonal to the plane of the disk, at least one fixed magnetic circuit comprising a core that is secant with all the turns of the track, the gap of which forms a plane that is substantially perpendicular to the support, a first motor device allowing for the access to and radial tracking of the track formed by at least one first coil mounted so that it moves on the core of the magnetic circuit and a second motor device that enables the focusing of the radiation on the track consisting of a second coil cooperating with a magnetic circuit. The optical head, the coil of the first motor device and the coil of the second motor device are rigidly fixed to one another so as to form a single compact moving element that moves in the gaps of the magnetic circuits. The disclosed device can be applied to digital optical disks.

11 Claims, 5 Drawing Sheets

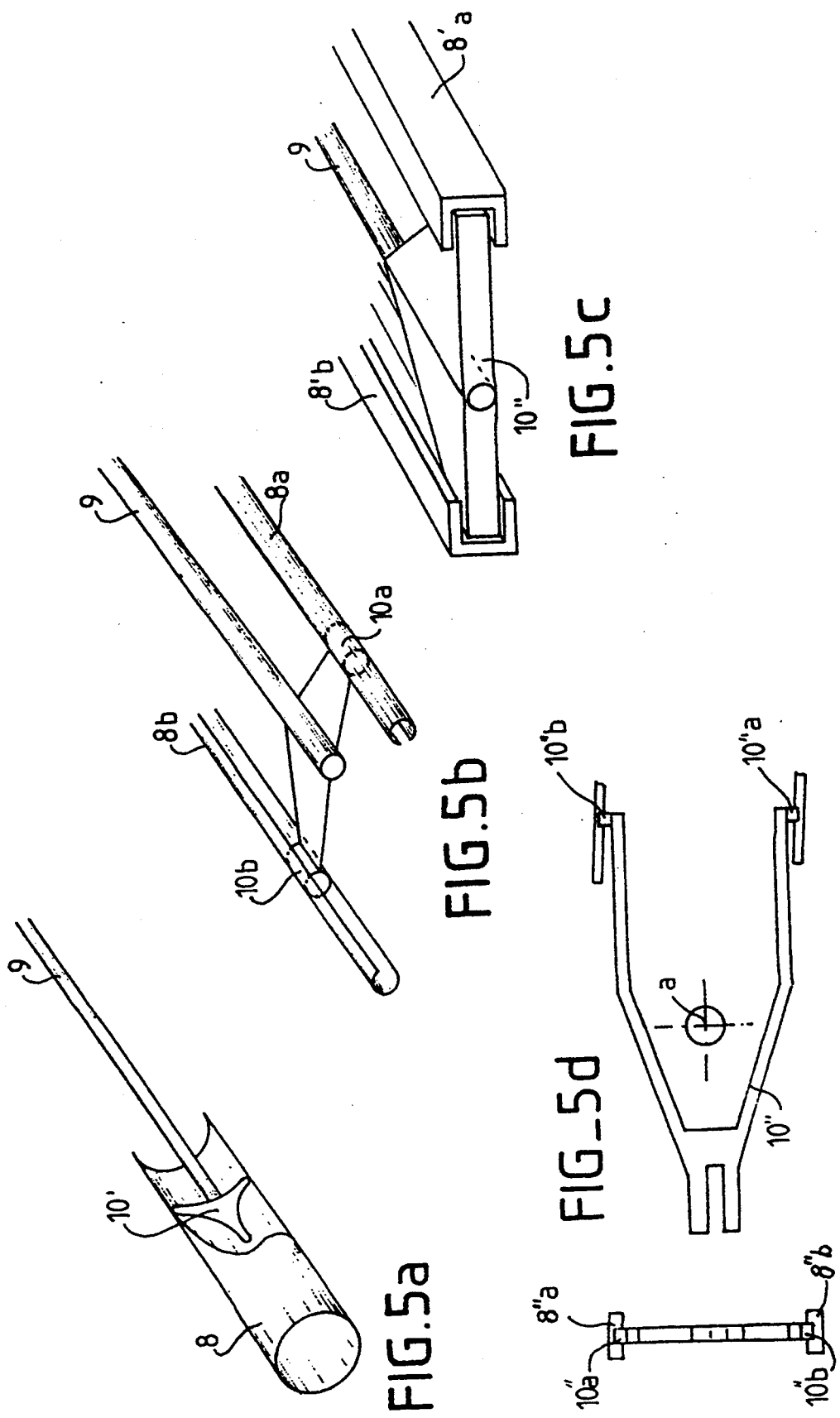

FIG_6
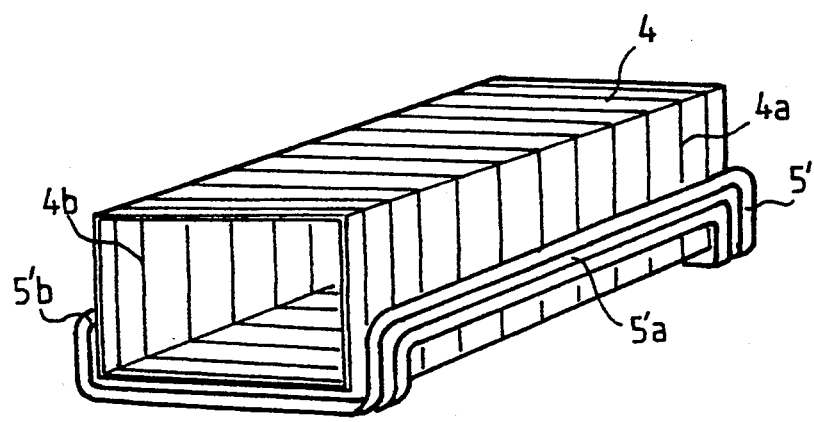

ACCESS AND FOLLOWER CONTROL DEVICE FOR OPTICAL DISK

This application is a continuation of application Ser. No. 07/542,422, filed Jun. 22, 1990, now abandoned.

BACKGROUND OF THE INVENTION

1. Field of the Invention

The present invention concerns a device for access to and follower control of a track borne by a medium, such as an optical disk, of information that is optically readable and/or recordable by focused radiation.

2. Description of the Prior Art

For in the case of the writing and/or the reading of an optical disk, it is necessary to gain access to a zone of the disk as well as to thereafter keep to this zone with high precision, both radially and perpendicularly to the surface of the disk. Thus, these prior art devices generally have three separate motor devices.

Now, for fulfilling all the above three functions, there already has been a description given in the French patent No. 83 03425 corresponding to U.S. Pat. No. 4,554,643, of an access and follower control device using only two motor devices. In this case, the access coil is used to fulfil both the access and the radial tracking functions. However, to obtain efficient operation, there is provision for flexible connection means between the coil and the sliding elements of the coil that provide access and radial tracking in the gap of a fixed magnetic circuit. For, the use of means in a simple sliding operation does not make it provide for satisfactory precision in the tracking of the track. Furthermore, in the French patent No. 82 03425 corresponding to U.S. Pat. No. 4,554,653, to prevent the focusing operation from being accompanied by a diaphragm effect on the optical system, the coils of the two motor devices are connected to each other by means of a flexible attachment, each coil being fixedly joined to an element of the optical head proper. The structure of the access and follower control device thus made increases the unbalance of the movable element and hence the mass of the balancing counterweight, the chief drawback of this being that it increases the weight of the head.

In pursuing studies on the access and follower control devices for an optical disk, the Applicant has perceived that, by using a single-piece structure for the assembly formed by the optical head and the two coils provided for in the motor devices, it is possible, as shall be explained further below, to get rid of the flexible connection means while at the same time preserving excellent precision of the positioning and thus lightening the moving element. This makes it possible to accelerate the access to the track.

SUMMARY OF THE INVENTION

As a consequence, an object of the present invention is a device for access to and follower control of a track borne by a medium of information that is readable and/or recordable optically by a focused radiation said track forming regularly spaced out or variably spaced out turns on the medium, the turns forming a spiral or taking the form of concentric circular elements, said device having an optical head with an optical axis orthogonal to the plane of the medium, at least one fixed magnetic circuit having at least one core that is secant with all the turns of the track and the gap of which forms a plane substantially perpendicular to the medium, a first motor device enabling access to and radial tracking of a track, said first motor device being formed by at least one first coil mounted so as to shift on the core of the magnetic circuit, and a second motor device, enabling the radiation to be focused on the track, said second motor device being formed by a second coil cooperating with a magnetic circuit, wherein the optical head, the coil of the first motor device and the coil of the second motor device are rigidly fixed to one another so as to form a single, compact, moving element moving in the gaps of the magnetic circuits.

Thus, with the above device, it is no longer necessary to use flexible connecting means interposed between the moving element and the means for sliding on the magnetic circuit for access and radial tracking. For, the focusing follower control motion creates a dynamic viscosity on the radial tracking process or on the access motion and vice versa. This dynamic viscosity can be explained as follows.

When a solid body is in motion while leaning on another solid body, as the access and radial tracking coil does on the core of its magnetic circuit, a frictional force, the value of which depends on the relative speed of the two solids, exists on their surface of contact which is assumed to be plane. As is well known, this solid frictional force limits the precision of the relative positioning of these two solids.

If, to the above-described useful motion, we now add another motion independent of this first motion and also located in the plane of contact of the two solids, the character of solid friction of the useful motion disappears: there is then a linear relationship between frictional force and speed for this useful motion, as in the case of a viscous friction. This particular situation is obtained if the forces generated in the coils respectively used for the focusing, on the one hand, and for the access and radial follower control, the other hand, are superimposed on the same solid.

Thus the possibility of eliminating the flexible connection elements simplifies the making of the access and follower control device and also provides for obtaining improved stability for the focusing loop.

Furthermore, the moving element is a single-piece structure. It may therefore be made in a very compact way and may consequently have a very low mass. This makes it possible to obtain very high accelerations and, consequently, very short access times.

According to one characteristic of the invention, the device has two magnetic circuits each cooperating with a coil of the motor devices.

Furthermore, according a preferred embodiment, the first coil consists of a cylindrical coil, the active conductors of which are directed along the optical axis of the optical head, and the second coil of which consists of a coil, which is preferably flat, the active conductors of which are directed perpendicularly to the optical axis. Preferably, the second coil is rigidly fixed to the cylindrical coil by means of at least one supporting element, such as ties or rigid suspension elements.

According to another characteristic of the present invention, the access and follower control device also has at least one anti-pitching device. This anti-pitching device leads to an improvement in the angular stability between the moving element and the disk.

According to a preferred embodiment, the anti-pitching device is formed by a rod fixed, at one end, to the moving element and having, at its other end, at least one means sliding in a channel, in parallel with the core of the first magnetic circuit.

According to another additional characteristic of the present invention, to localize the guidance friction and improve the angular stability in the axes corresponding to the rolling and to the yawing motions, small pieces of material with a low coefficient of friction, for example "teflon", are fixed to the access and radial follower control coil and to the focusing coil.

BRIEF DESCRIPTION OF THE DRAWINGS

Other characteristics and advantages of the present invention will appear from the following description of a preferred embodiment, made with reference to the appended drawings, wherein:

FIGS. 5A to 5D show different embodiments of an anti-pitching device, and

FIG. 6 is simplified view in perspective of a variant of the access and follower control device according to the invention.

DESCRIPTION OF PREFERRED EMBODIMENTS

Figure 1:
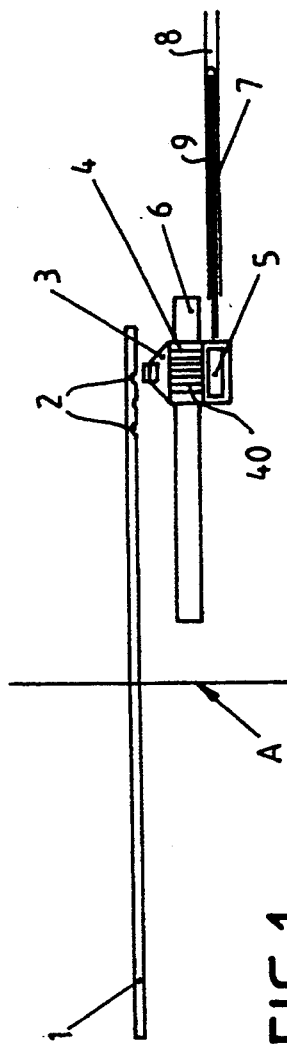
FIG. 1 is a schematic view of an access and follower control device for an optical disk, incorporated in the disk recording/reading device.

A schematic view has been given, in FIG. 1, of a device, according to the present invention, for access to and follower control of a track of an optical disk 1 rotating on a rotation axis A.

In a known way, the pieces of information to be read or written are recorded in concentric circles or on a spiral forming the track. For example, this track is shown schematically by grooves or turns 2 in figure 1.

To read or write a piece of information, and assuming that the focusing has already been acquired, the access and follower control device is brought before the groove 2 and then the device is follower-controlled in radial tracking so that it remains accurately positioned with respect to the track.

As shown in FIG. 1, the access and follower control device has at least one optical head 3 which shall be described in greater detail here below, a first access and radial tracking coil 4 and a second focusing coil 5. This assembly forms a moving element. In accordance with the present invention, the head 3 is fixedly connected to the access and radial tracking coil 4 as well as to the focusing coil 5. This moving element is made to shift in translation in the gaps of two fixed magnetic circuits. To simplify the drawing of FIG. 1, only the central core 6 of the first fixed magnetic circuit has been represented. This core 6 is secant with all the grooves or turns 2 of the disk 1 and extends over a length equal to at least the useful recording length plus the length of the moving element, not counting the anti-pitching device. In effect, the pieces of information are recorded in a standard way in a circular ring. The first magnetic circuit in association with the coil 4 forms the first motor device enabling the access to and the tracking of a track. The second magnetic track in association with the coil 5 forms the second motor device enabling the focusing.

The laser source, the focusing lenses and the electronic circuits associated with the coils 4 and 5 to set up the follower controls are not shown in figure 1, for these circuits are well known to those skilled in the art.

Furthermore, as shown in FIG. 1, the moving element is provided with an anti-pitching device 7. In the embodiment shown, this device 7 is formed by a channel 8 in which a rod 9 can slide. This rod 9 is fixed at one end to the moving element and bears, at its other end, specific anti-pitching means, the shape of which corresponds to the shape of the channel 8. These specific anti-pitching means shall be described in greater detail here below.

Figure 4:
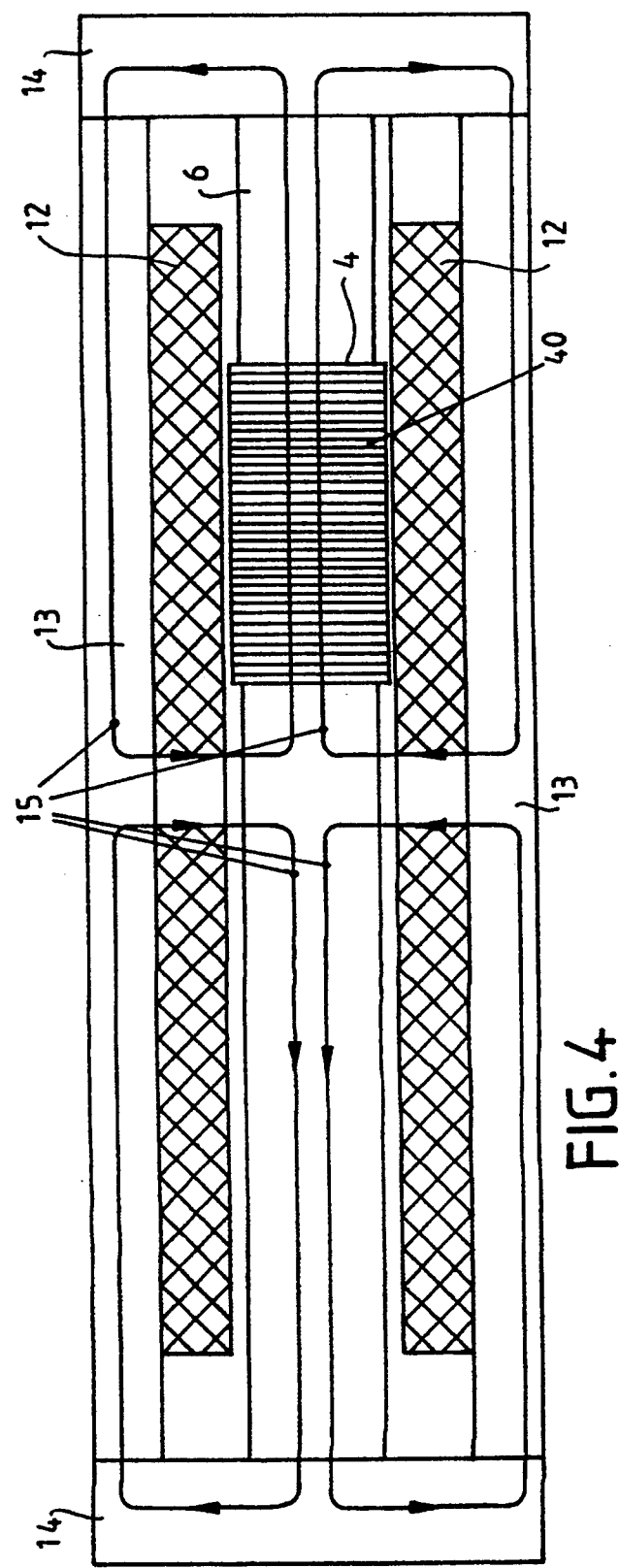
FIG. 4 is a plane top view of the first magnetic circuit.
Figure 2:
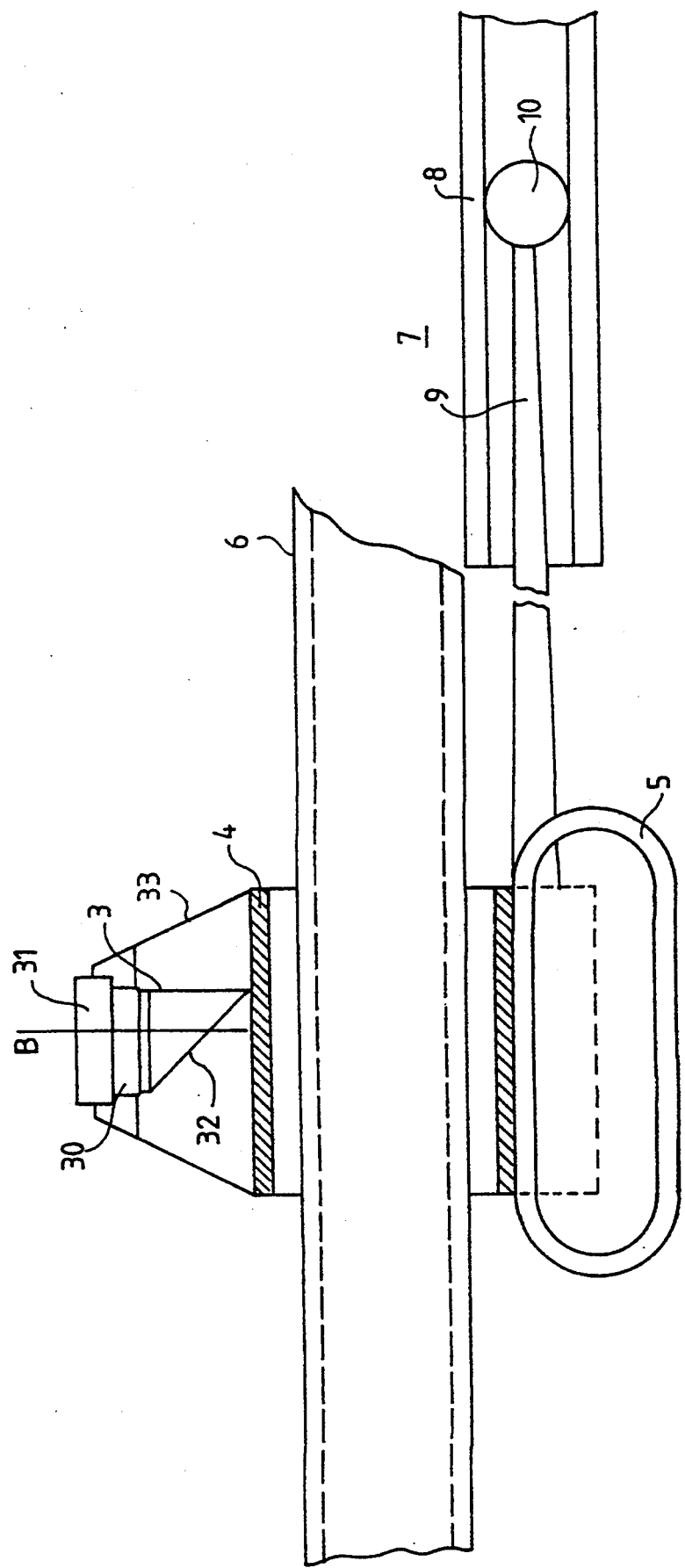
FIG. 2 is a longitudinal sectional view of an access and follower control device according to the present invention.
Figure 3:
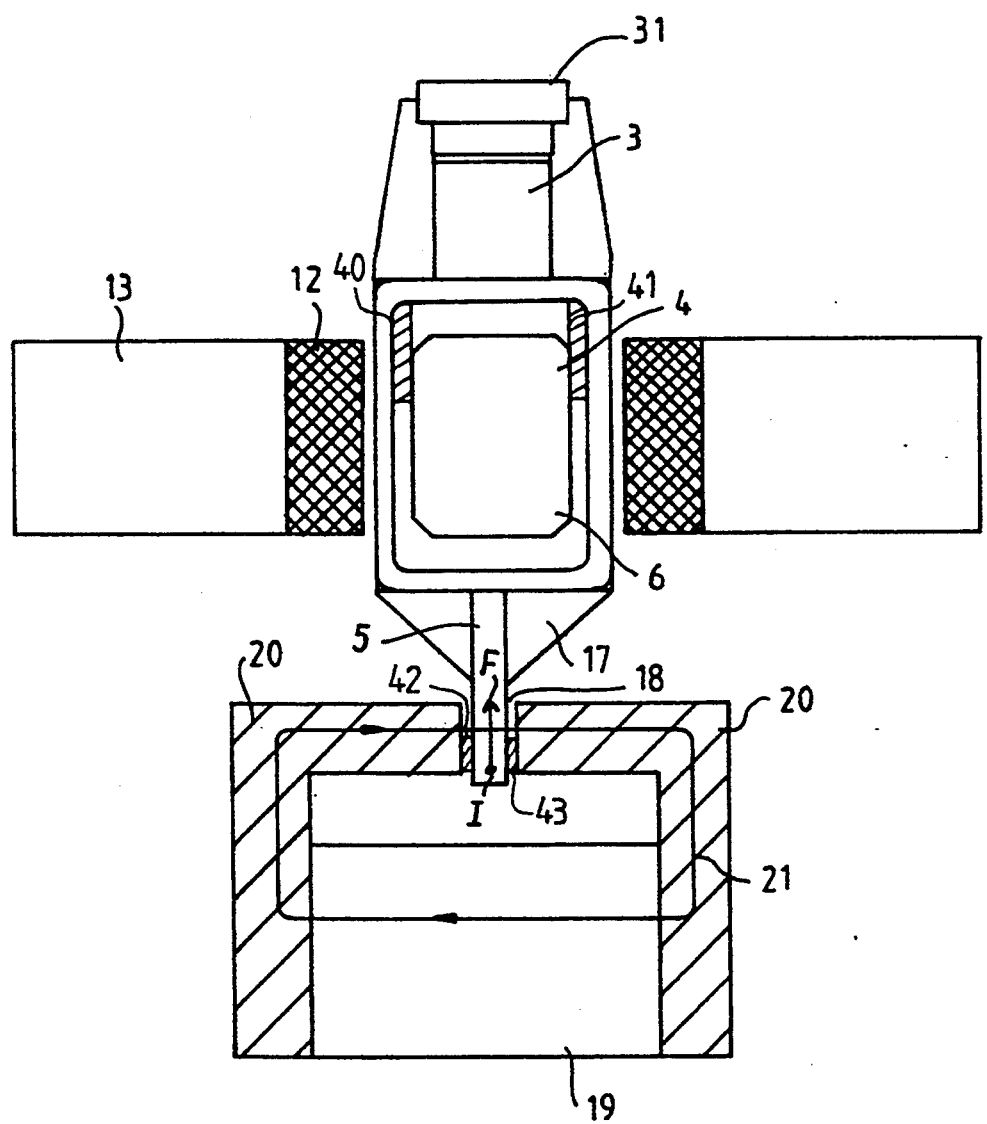
FIG. 3 is a cross-sectional view of the device of FIG. 2.

We shall now give a more detailed description, with reference to FIGS. 2 to 4, of the moving element and the two fixed magnetic circuits by which it is possible to set up the two motor devices needed for the access and radial tracking as well as the focusing. As shown in FIGS. 2 and 3, the optical head 3 is formed more particularly by a cylindrical element 30 bearing, at its upper end, a focusing objective 31 and, at its lower end, a reflecting mirror 32 designed to reflect the beam coming from the laser source towards the disk. The axis B of the head is placed orthogonally to the plane of the disk. This head 3 is fixed to a rigid supporting element 33 which is fixedly joined to the coil 4 of the motor device enabling access to and radial tracking of the track. As shown in the different figures, this coil 4 may consist of a cylindrical frame, with an axis parallel to a radius of the disk. On this frame, there is wound at least one conductor, the turns of which take direction, in their active part, along the optical axis of the head, i.e. perpendicularly to the axis of the cylindrical coil. Preferably, the coil 4 is self-supporting, i.e. it has no frame and its rigidity has been ensured solely by the bonding of the turns of its conductor. As shown in FIGS. 3 and 4, the coil 4 surrounds the central core 6 of the first magnetic circuit on which it is made to slide.

Furthermore, as shown in FIG. 3, two parts 40 and 41 are fixed to the access and radial tracking coil 4. These parts 40 and 41 provided for the guiding of this coil on the core 6 of its magnetic circuit for any motion, in the access or radial direction as well as in the focusing direction. In association with the anti-pitching device 7, they enable the yawing motion of the moving element to be limited. As shown more particularly in FIG. 4, the first magnetic circuit has, in addition to the central core 6, left-hand and right-hand magnets 12 fixed to pole pieces 13. The pole pieces 13 and the central core 6 are fixedly joined together by end bars 14 which enable the field to be closed at the ends of this motor device. In this case, the field lines have the shape represented by the arrowed lines 15. Depending on the direction of the current I applied to the conductors of the coil 4, the moving element is made to shift radially leftwards or rightwards in FIG. 1, so as to get positioned in front of a groove 2 to achieve access and then track this groove as a function of the follower control signals sent.

Furthermore, beneath the coil 4, a coil 5, used to perform the focusing, is rigidly fixed by means of a fixing system 17 comprising, for example, angle irons or rigid elements. This coil 5 is formed by a flat coil which is substantially elliptical in the embodiment of FIG. 2. This coil has conductors taking a direction perpendicular to the optical axis of the optical head 3. As shown in FIG. 3, the lower part of the coil 5, namely the lower strands of the conductors 5, are positioned in the gap of a second fixed magnetic circuit, the gap 18 of which is parallel to the gaps of the first magnetic circuit. This second magnetic circuit has a magnet 19 and two pole pieces 20, the assembly being C-shaped in the example described. In this case, the magnetic field lines are represented by the reference 21. Thus, when the coil 5 is crossed by an electrical current I, a vertically directed force F is created. This makes it easy to achieve the follower control in focusing. Furthermore, two parts 42 and 43 are fixed to the focusing coil 5. They provide for the guidance of this coil in its magnetic circuit. In association with the parts 40 and 41, they make it possible to limit the rolling motion of the moving element.

Furthermore, as shown in FIG. 2, the device of the present invention has an anti-pitching device 7 formed by a rod 9 provided at its end with a ball 10 made to slide in a channel 8 with an axis that is substantially parallel to a radius of the disk.

As shown in FIGS. 5A to 5D, different embodiments can be envisaged for the anti-rolling device.

In the embodiment of FIG. 5A, the anti-pitching device is formed by an element with three arms 10' which slides in a channel formed by a tube 8.

In FIG. 5B, the anti-pitching device is formed by two cylindrical stubs 10a, 10b, connected by ties to the rod 9 and made to slide in two semi-cylindrical channels 8a, 8b.

In the device of FIG. 5C, a rectangular-sectioned tie 10" is fixed to the end of the rod 9 and made to slide in two substantially U-sectioned channels 8'a, 8'b.

In FIG. 5D, the anti-pitching device is formed by two arms which may be pointed towards the center of the recording/reading device and pass by each side of the motor axis A, thus reducing the space occupied by the device.

The two channels 8"a and 8"b are similar to those of FIG. 5C. The two stubs 10"a and 10"b are parallelepiped-shaped.

This device provides for both anti-pitching and anti-rolling protection, as do also the devices of FIGS. 5B and 5C. With these three devices, the anti-rolling guidance elements placed on either side of the focusing coil can be eliminated.

It must be noted that, with the anti-pitching device pointed towards the center of the disk, it is possible to partially correct defects related to the tilting of the face of the disk, located in a radial plane passing through the axis of the disk.

It is clear to those skilled in the art that other embodiments may be envisaged for the anti-rolling device.

FIG. 6 shows a view in perspective of the relative position of the access and radial follower control coil 4 and a focusing coil 5'. Only the coils are shown schematically in order to simplify the figure. The sides 4a and 4b are the active portions of the conductor or conductors of the coil 4. The parts 5'a and 5'b are the active portions of the coil 5'. This embodiment makes it possible to have only one magnetic circuit 13, 12, 6. In this case, the coil 5 may be formed by a flat coil folded in a U so as to fit in beneath the access coil 4.

The access and follower control device according to the present invention has the advantage wherein it is a single-piece structure and can be made very compactly so that its weight can be substantially reduced. In this device, it as been possible to eliminate the flexible connections, between the coil 4 and the sliding elements, by using the dynamic viscosity produced by the simultaneous motion of the first motor device and of the second motor device.

Thus, for example, by using an objective with a 6 mm diameter, a numerical aperture of 0.47 to 0.55, a total reflection prism to achieve the radial mirror function and aluminium wire windings, it has been possible to obtain a moving element with a length (along the direction of the radial shift) of 15 mm, a height (in the direction of the axis of rotation of the disk) of 26 mm and a width of 10 mm and a mass of 3 gr

What is claimed is:

1. A device for access to and follower control of a track borne by a medium of information, said track having turns on the medium, comprising:
    an optical head with an optical axis orthogonal to the plane of the medium, said optical head including a focusing objective and reflecting means to reflect an incoming light beam towards said medium substantially along said optical axis, said objective and said reflecting means being rigidly fixed to one another in a rigid block;
    at least one fixed magnetic circuit having at least one core that is secant with all the turns of the track;
    a first motor device enabling access to a track, said first motor device being formed by at least one first coil mounted so as to shift on the core of the magnetic circuit; and
    a second motor device, enabling said light beam to be focused on the track, said second motor device being formed by a second coil actuated by a magnetic circuit, and
    said optical head with the focussing objective rigidly fixed to the reflecting means, and the at least one first coil of the first motor device and the second coil of the second motor device are rigidly fixed to one another and form a single integral moving element.

2. A device according to claim 1, comprising a first fixed magnetic circuit comprising at least one core secant with all the turns of the track on which the coil of the first motor device moves, and a second fixed magnetic circuit, having a gap intersecting all the turns of the tracks in which the coil of the second motor device moves.

3. A device according to claim 1, comprising only one fixed magnetic circuit formed by at least one core that is secant with all the turns of the track and having a gap of which the coils of the two motor devices move.

4. A device according to claim 1, wherein the first coil consists of a cylindrical coil, constituted by wound conductors with active conductors directed along the optical axis.

5. A device according to claim 1, wherein the second coil consists of a coil, constituted by wound conductors with active conductors directed perpendicularly to the optical axis.

6. A device according to claim 5, wherein the second coil is rigidly fixed to the first coil by means of at least one supporting element.

7. A device according to claim 5, wherein the second coil is shaped so that it fits on the first coil.

8. A device according to claim 1, further including at least one anti-pitching device.

9. A device according to claim 8, wherein the anti-pitching device is formed by at least one rod fixed, at one end, to the moving element and having, at its other end, at least one means sliding in at least one channel, in parallel with the core of the first magnetic circuit.

10. A device according to claim 1, comprising anti-rolling and anti-yawing means.

11. A device according to claim 10, wherein the anti-rolling and anti-yawing means are made of pieces of a material with a low coefficient of friction fixed to the coils.

* * * * *